United States Patent [19]

Ross

[11] 4,413,803

[45] Nov. 8, 1983

[54] PIVOTING LICENSE PLATE BRACKET

[76] Inventor: William Ross, P.O. Box 51, Vermilion Bay, Canada, P0V 2V0

[21] Appl. No.: 270,586

[22] Filed: Jun. 4, 1981

[51] Int. Cl.³ .............................................. A47F 7/14
[52] U.S. Cl. ................................ 248/475 B; 40/209; 248/483
[58] Field of Search .................. 248/475 B, 479, 483, 248/490, 491, 624, 610; 40/209, 591, 10 R; 350/307; 296/1 C; 293/1

[56] References Cited

U.S. PATENT DOCUMENTS

| | | | |
|---|---|---|---|
| 2,486,105 | 10/1949 | Bonar | 248/479 |
| 2,976,000 | 3/1961 | Gunderson | 248/475 B |
| 3,430,376 | 3/1969 | Drybread et al. | 40/209 |
| 3,494,075 | 2/1970 | Kunevicius | 293/1 |
| 3,698,798 | 10/1972 | Bolton | 350/307 |
| 3,736,417 | 5/1973 | Williams | 248/610 |
| 3,742,209 | 5/1973 | Williams | 248/624 |
| 4,123,030 | 10/1978 | Johanson | 248/475 B |
| 4,223,864 | 9/1980 | Harlow | 248/490 |
| 4,273,369 | 6/1981 | Rosenbaum | 293/1 |

Primary Examiner—William H. Schultz
Assistant Examiner—Ramon O. Ramirez
Attorney, Agent, or Firm—Stanley G. Ade

[57] ABSTRACT

Small tilting trailers such as boat trailers and the like normally require license plates. This invention consists of a license plate holder pivotally secured for fore and aft swinging movement adjacent the rear of the trailer in the usual location and normally being held in the substantially vertical position by means of small return springs. An elongated roller is mounted across the base of the holder to facilitate the swinging movement if the roller strikes objects such as rock, etc. and also to facilitate the swinging movement if the roller contacts the ground surface when the trailer is in the tilt position.

12 Claims, 4 Drawing Figures

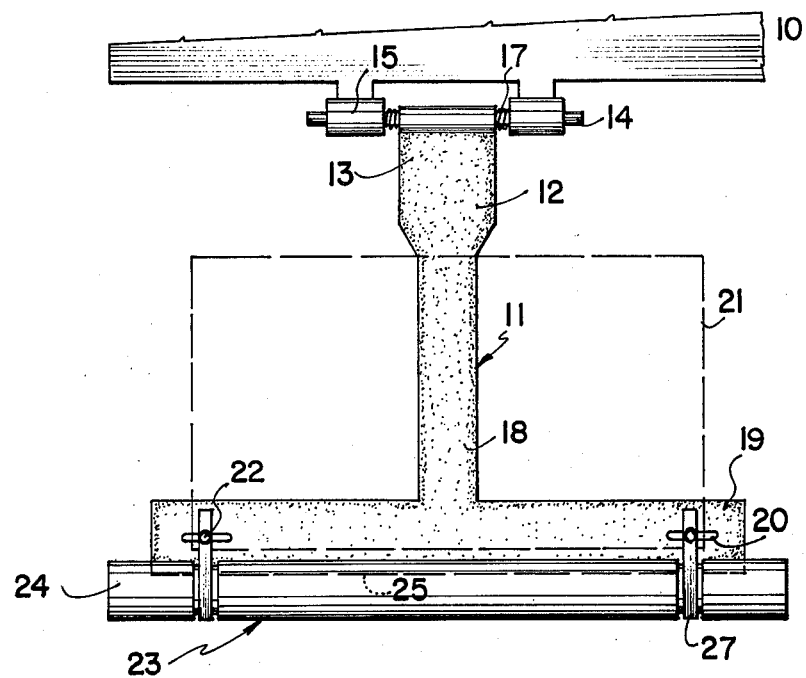
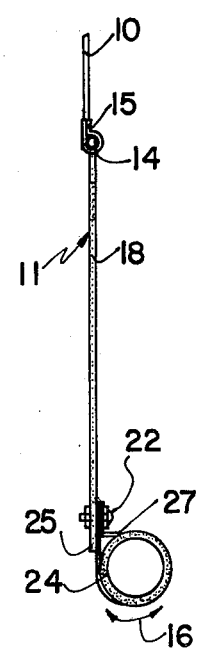
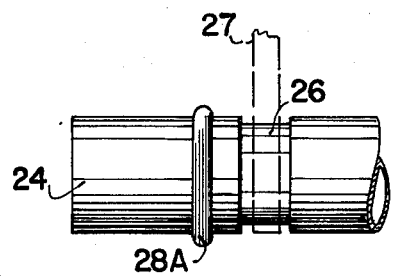
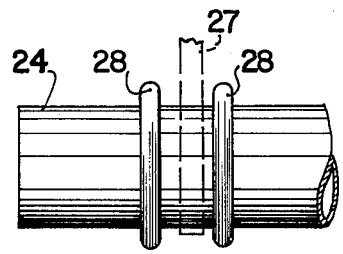

PIVOTING LICENSE PLATE BRACKET

BACKGROUND OF THE INVENTION

This invention relates to new and useful improvements in license plate holders, particularly license plate holders used on small trailers such as boat trailers, snowmobile trailers and the like which normally include a tilting action to facilitate loading and unloading of the object being carried thereby.

It is also useful for normal trailers which may be reversed against a loading dock or the like under which circumstances the license plate may strike the edge of the dock.

Trailers, particularly small tilting trailers, normally require that a license plate be carried adjacent to the rear offside corner thereof and in such a location that the objects being carried by the trailer such as a boat or the like, do not obstruct the visibility of the license plate. This means that they are behind the transverse wheel axis so that when the trailer is tilted for loading or unloading, the license plate often strikes the ground.

Also, when used in rough country, tree stumps, rocks or the like may engage the underside of the license plate holder. Either circumstances causes bending of the license plate bracket and often these brackets break off so that the license plate is lost or at least badly damaged.

Attempts have been made to provide a pivoted license plate holder and while these are satisfactory under certain circumstances, nevertheless if the trailer is being tilted while it is stationary, such license plate holders can still engage the ground without being deflected forwardly or rearwardly, once again damaging or breaking off the license plate bracket. An example of such a swinging license plate holder is shown in U.S. Pat. No. 2,591,196.

SUMMARY OF THE INVENTION

The present invention overcomes these disadvantages by providing a license plate holder which includes means to facilitate the fore and aft movement whether the trailer is moving or stationary and in accordance with the invention there is provided a license plate holder for trailers and the like which include plate holder support means thereon; said license plate holder comprising in combination a license plate bracket, means for pivotally supporting the license plate bracket from the support means for fore and aft swinging movement relative to the trailer and means on the underside of said license plate bracket to facilitate the displacement of the bracket fore or aft upon engagement of said means with the ground surface or an object extending upwardly from the ground surface.

Another advantage of the present invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a rear elevation of a license plate holder pivotally secured to the plate holder support means of a trailer or the like.

FIG. 2 is a view at right angles to FIG. 1.

FIG. 3 is a front elevation of one end of the roller assembly showing one method of mounting same to the underside of the license plate bracket.

FIG. 4 is similar to FIG. 3, but showing an alternative embodiment.

In the drawings like characters of reference indicate corresponding parts in the different figures.

DETAILED DESCRIPTION

Proceeding therefore to describe the invention in detail, reference to FIGS. 1 and 2 will show, in fragmentary form, the lower edge of a license plate support means normally provided on the trailer (not illustrated).

The invention collectively designated 11 includes a license plate bracket 12 including an upper mounting portion 13 which in turn is journalled upon a transverse pin 14 held within clips 15 on the underside of the support means 10 and mounted so that it can move in a fore and aft direction indicated by the double headed arrow 16 in FIG. 2. Conventional coil return springs 17 or the like engage around a portion of the pin 14 and react between the upper portion 13 of the bracket and the clips 15 normally maintaining the bracket in the substantially vertical position shown in FIG. 2 which is situated perpendicular to the longitudinal axis of the trailer (not illustrated).

A vertically extending stem portion 18 extends downwardly from the upper portion 13 and terminates in a transverse bracket portion 19 extending upon either side of the lower end of the stem 18. It is provided with elongated slots 20 one upon each side thereof to which a conventional rectangular license plate 21 may be secured in the conventional manner, by means of nut and bolt assemblies 22 extending through the elongated slots 20 which are provided for limited horizontal adjustment to suit the mounting apertures (not illustrated) normally provided along the lower edge of the license plate 21.

What might be termed anti-friction means are provided collectively designated 23. In this embodiment, said anti-friction means comprises an elongated roller 24 journalled for rotation to adjacent the lower edge 25 of the bracket portion 19 and partially depending therebelow.

This roller, which may be made of plastic or any other suitable material, is preferably mounted by providing a pair of annular grooves 26 within the periphery of the roller adjacent each end thereof.

A circular bracket or ring 27 freely engages within the annular groove so that the rings depend downwardly below the lower edge 25 of the bracket portion 19. These rings, being seated within the annular grooves 26, permit the roller to rotate freely therein but the sides of the annular grooves 26 prevent endwise movement of the roller relative to the rings.

FIG. 4 shows an alternative method of mounting the roller 24 taking the form of a pair of resilient O rings 28 frictionally engaged in spaced and parallel relationship around the roller with the mounting ring 27 being situated around the periphery of the roller between the pair of O rings. Once again the roller is free to rotate within the mounting rings 27 but endwise movement is prevented by the O rings 28.

These O rings also serve a further purpose inasmuch as they stand proud of the surface of the roller 24 and hence engage the ground if the trailer is tilted and facilitate the displacement of the license plate holder fore or aft in the direction of the double headed arrow 16 as hereinbefore described.

If the annular groove 26 is used for mounting the O rings as shown in FIG. 3, then it is desirable that a resilient O ring 28A be frictionally engaged around the roller adjacent the groove to serve a similar purpose.

In operation, the springs 17 normally maintain the license plate in the normal position shown in FIG. 2 but if the trailer is being towed over rough ground, any obstructions such as tree roots, rocks or the like which may engage the license plate, deflects it rearwardly against the pressure of the springs and when the obstruction is passed, the springs return it to the normal position.

Also, if the trailer is being reversed into position, and an object such as a loading ramp or the like strikes the license plate, then the license plate holder is deflected forwardly against the pressure of the springs without damage occurring thereto.

Perhaps more importantly, when the trailer is tilted for loading and unloading, the roller facilitates the deflection of the license plate when it strikes the ground, the direction of such deflection depending upon the surface of the ground and the angle at which the roller engages the ground.

In all cases, the danger of damage and/or breakage and loss is reduced considerably with the springs returning the license plate holder to the normal position after the loader is clear of the obstruction.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A license plate holder for trailers and the like which include plate holder support means thereon; said license plate holder comprising in combination a license plate bracket, means for pivotally supporting the license plate bracket from the support means for fore and aft swinging movement relative to the trailer and means on the underside edge of said license plate bracket to protect said lower edge upon engagement of same means on said underside edge with the ground surface, said means on said underside edge including at least one roller journalled for rotation to adjacent the lower side of said bracket with the underside of said roller being below the lower edge of said bracket and means to secure said roller to said bracket for free rotation relative to said bracket.

2. The invention according to claim 1 which includes spring means reacting between said license plate bracket and the associated license plate holder support means, normally returning and maintaining said holder substantially perpendicular to the longitudinal axis of the trailer.

3. The invention according to claim 1 which includes at least one roller mounting component secured to and depending from said bracket.

4. The invention according to claim 2 which includes at least one roller mounting component secured to and depending from said bracket.

5. The invention according to claim 1 in which said roller extends transversely across said bracket, said means to secure said roller includes at least a pair of substantially circular mounting rings secured to said bracket, and annular grooves formed in the periphery of said roller, said rings seating within said grooves, said roller being freely rotatable within said rings, said grooves preventing endwise movement of said roller relative to said rings.

6. The invention according to claim 2 in which said roller extends transversely across said bracket, said means to secure said roller includes at least a pair of substantially circular mounting rings secured to said bracket, and annular grooves formed in the periphery of said roller, said rings seating within said grooves, said roller being freely rotatable within said rings, said grooves preventing endwise movement of said roller relative to said rings.

7. The invention according to claim 3 in which said roller extends transversely across said bracket, said means to secure said roller including at least a pair of circular mounting rings secured to said bracket, and a pair of resilient O rings for each mounting ring, each of said pairs of O rings being engaged around the periphery of said roller in spaced apart relationship one upon each side of one of said mounting rings, said roller being freely rotatable within said rings, said O rings preventing endwise movement of said roller relative to said rings.

8. The invention according to claim 4 in which said roller extends transversely across said bracket, said means to secure said roller including at least a pair of circular mounting rings secured to said bracket, and a pair of resilient O rings for each mounting ring, each of said pairs of O rings being engaged around the periphery of said roller in spaced apart relationship one upon each side of one of said mounting rings, said roller being freely rotatable within said rings, said O rings preventing endwise movement of said roller relative to said rings.

9. The invention according to claim 5 which includes a resilient O ring engaged around the periphery of said roller one adjacent each end thereof, with the outer surface of each of said O rings being engageable with the ground surface.

10. The invention according to claim 6 which includes a resilient O ring engaged around the periphery of said roller one adjacent each end thereof, with the outer surface of each of said O rings being engageable with the ground surface.

11. The invention according to claim 7 which includes a resilient O ring engaged around the periphery of said roller one adjacent each end thereof, with the outer surface of each of said O rings being engageable with the ground surface.

12. The invention according to claim 8 which includes a resilient O ring engaged around the periphery of said roller one adjacent each end thereof, with the outer surface of each of said O rings being engageable with the ground surface.

* * * * *